(12) United States Patent
Sakayanagi

(10) Patent No.: US 12,214,798 B2
(45) Date of Patent: Feb. 4, 2025

(54) REMAINING BATTERY LEVEL DISPLAY METHOD

(71) Applicant: TOYOTA JIDOSHA KABUSHIKI KAISHA, Aichi-ken (JP)

(72) Inventor: Yoshihiro Sakayanagi, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 67 days.

(21) Appl. No.: 18/323,419

(22) Filed: May 25, 2023

(65) Prior Publication Data
US 2024/0083451 A1    Mar. 14, 2024

(30) Foreign Application Priority Data
Sep. 12, 2022  (JP) .................................. 2022-144356

(51) Int. Cl.
*B60W 50/14*    (2020.01)
*B60K 35/00*    (2024.01)
*B60K 35/28*    (2024.01)

(52) U.S. Cl.
CPC ............. *B60W 50/14* (2013.01); *B60K 35/00* (2013.01); *B60K 35/28* (2024.01); *B60K 2360/169* (2024.01); *B60W 2050/146* (2013.01); *B60W 2510/244* (2013.01)

(58) Field of Classification Search
CPC ........... B60W 50/14; B60W 2050/146; B60W 2510/244; B60K 35/00; B60K 35/28; B60K 2360/169
See application file for complete search history.

(56) References Cited

U.S. PATENT DOCUMENTS

2014/0325968 A1*  11/2014  Suzuki ...................... F01N 9/00
                                                    422/109

FOREIGN PATENT DOCUMENTS

JP          2014-219749 A    11/2014

* cited by examiner

*Primary Examiner* — Nabil H Syed
*Assistant Examiner* — Cal J Eustaquio
(74) *Attorney, Agent, or Firm* — HAUPTMAN HAM, LLP

(57) ABSTRACT

A remaining battery level display method is a method of displaying a remaining battery level of a rental electric vehicle, and includes: setting an allocated battery capacity allocated to a user of the rental electric vehicle; and displaying, on a display of the rental electric vehicle, remaining level information based on the allocated battery capacity. The displaying of the remaining level information includes: displaying, as 100%, a remaining battery level at a start of rental to the user, displaying, as 0%, a remaining battery level lower than an actual remaining battery level at the start of the rental by the allocated battery capacity, and displaying the remaining battery level so as to decrease between 100% and 0% in accordance with a decrease in the actual remaining battery level.

9 Claims, 10 Drawing Sheets

<Problem>

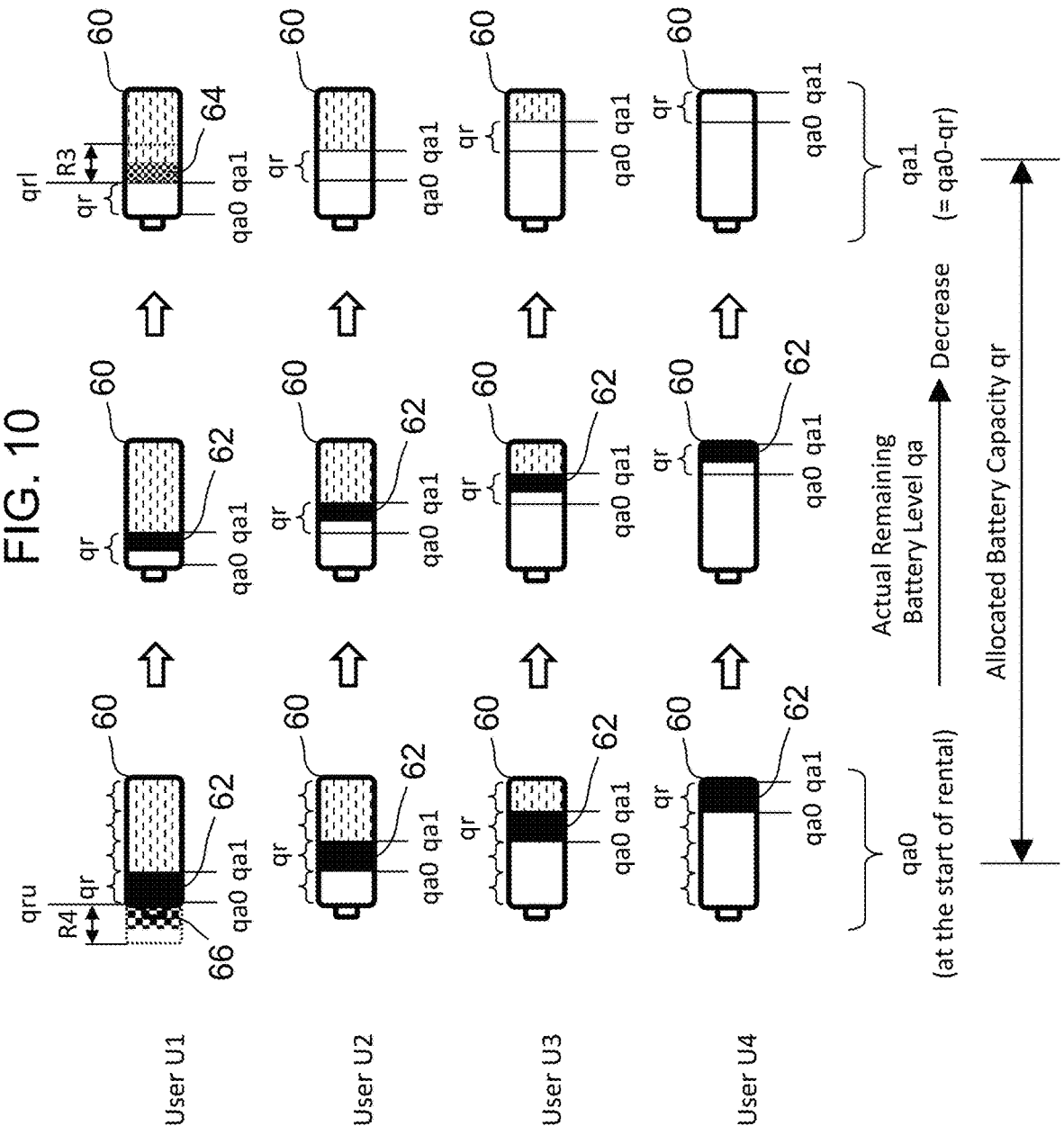

REMAINING BATTERY LEVEL DISPLAY METHOD

CROSS-REFERENCE TO RELATED APPLICATION

The present disclosure claims priority under 35 U.S.C. § 119 to Japanese Patent Application No. 2022-144356, filed on Sep. 12, 2022, which is incorporated herein by reference in its entirety.

BACKGROUND

Technical Field

The present disclosure relates to a remaining battery level display method of an electric vehicle rented to a user.

Background Art

JP 2014-219749 A discloses a vehicle reservation system used for car sharing using an electric vehicle. This vehicle reservation system calculates an amount of electric power required when using the electric vehicle in consideration of the height difference of the travel route and the driving method of the user.

SUMMARY

Charging an electric vehicle (BEV) takes time. Therefore, for example, when one BEV is rented to a plurality of users in one day, the same BEV may not be able to be rented to the second and subsequent users in a fully charged state. As a result, for rental, a BEV with a high remaining battery level is preferred by the users, and a BEV that is not in a fully charged state is kept away from the users. This leads to a reduction in the utilization rate per one BEV.

The present disclosure has been made in view of the problem described above, and an object of the present disclosure is to provide a remaining battery level display method of a rental electric vehicle that can improve the utilization rate thereof.

A remaining battery level display method according to a first aspect of the present disclosure is a method of displaying a remaining battery level of a rental electric vehicle, and includes: setting an allocated battery capacity allocated to a user of the rental electric vehicle; and displaying, on a display of the rental electric vehicle, remaining level information based on the allocated battery capacity. The displaying of the remaining level information includes: displaying, as 100%, a remaining battery level at a start of rental to the user, displaying, as 0%, a remaining battery level lower than an actual remaining battery level at the start of the rental by the allocated battery capacity, and displaying the remaining battery level so as to decrease between 100% and 0% in accordance with a decrease in the actual remaining battery level.

A remaining battery level display method according to a second aspect of the present disclosure is a method of displaying a remaining battery level of a rental electric vehicle, and includes: setting an allocated battery capacity allocated to a user of the rental electric vehicle; and displaying, on a display of the rental electric vehicle, remaining level information based on the allocated battery capacity. The displaying of the remaining level information includes: displaying, as a remaining battery level at a start of rental to the user, the allocated battery capacity or a distance travelable with the allocated battery capacity, displaying, as 0, a remaining battery level lower than an actual remaining battery level at the start of the rental by the allocated battery capacity, and displaying the remaining battery level so as to decrease between the allocated battery capacity or the distance, and 0 in accordance with a decrease in the actual remaining battery level.

A remaining battery level display method according to a third aspect of the present disclosure is a method of displaying a remaining battery level of a rental electric vehicle, and includes: setting an allocated battery capacity allocated to a user of the rental electric vehicle; and using a battery mark representing a battery to display, on a display of the rental electric vehicle, remaining level information based on the allocated battery capacity. The displaying of the remaining level information includes graphically displaying the remaining battery level on the battery mark indicating a total battery capacity such that the remaining battery level decreases within a range of the allocated battery capacity in accordance with a decrease in actual remaining battery level while an actual remaining battery level at a start of rental is associated with an upper limit of the allocated battery capacity.

A remaining battery level display device according to a fourth aspect of the present disclosure is a device configured to display a remaining battery level of a rental electric vehicle, and includes a display and a processor that causes the display to display remaining level information based on an allocated battery capacity allocated to a user of the rental electric vehicle. The displaying of the remaining level information in this remaining battery level display device is the same as the displaying of the remaining level information in the remaining battery level display method according to the first aspect.

A remaining battery level display device according to a fifth aspect of the present disclosure is a device configured to display a remaining battery level of a rental electric vehicle, and includes a display and a processor that causes the display to display remaining level information based on an allocated battery capacity allocated to a user of the rental electric vehicle. The displaying of the remaining level information in this remaining battery level display device is the same as the displaying of the remaining level information in the remaining battery level display method according to the second aspect.

A remaining battery level display device according to a sixth aspect of the present disclosure is a device configured to display a remaining battery level of a rental electric vehicle, and includes a display and a processor that causes the display to display remaining level information based on an allocated battery capacity allocated to a user of the rental electric vehicle using a battery mark representing a battery. The displaying of the remaining level information in this remaining battery level display device is the same as the displaying of the remaining level information in the remaining battery level display method according to the third aspect.

According to the present disclosure, the displaying of the remaining battery level on the display is not performed using the actual remaining battery level itself. Also, the remaining level information based on the allocated battery capacity allocated to the user is displayed on the display by the method specified in each of the aspects described above. As a result, it is possible to reduce a decrease in the utilization rate of the rental electric vehicle caused by the fact that the electric vehicle cannot be rented in a fully charged state. In other words, the utilization rate of the electric vehicle can be improved.

BRIEF DESCRIPTION OF THE DRAWINGS

FIG. 10 is a diagram used to describe a fifth modified example of the specific displaying of the remaining level information Iq according to the embodiment.

DETAILED DESCRIPTION

Figure 1:
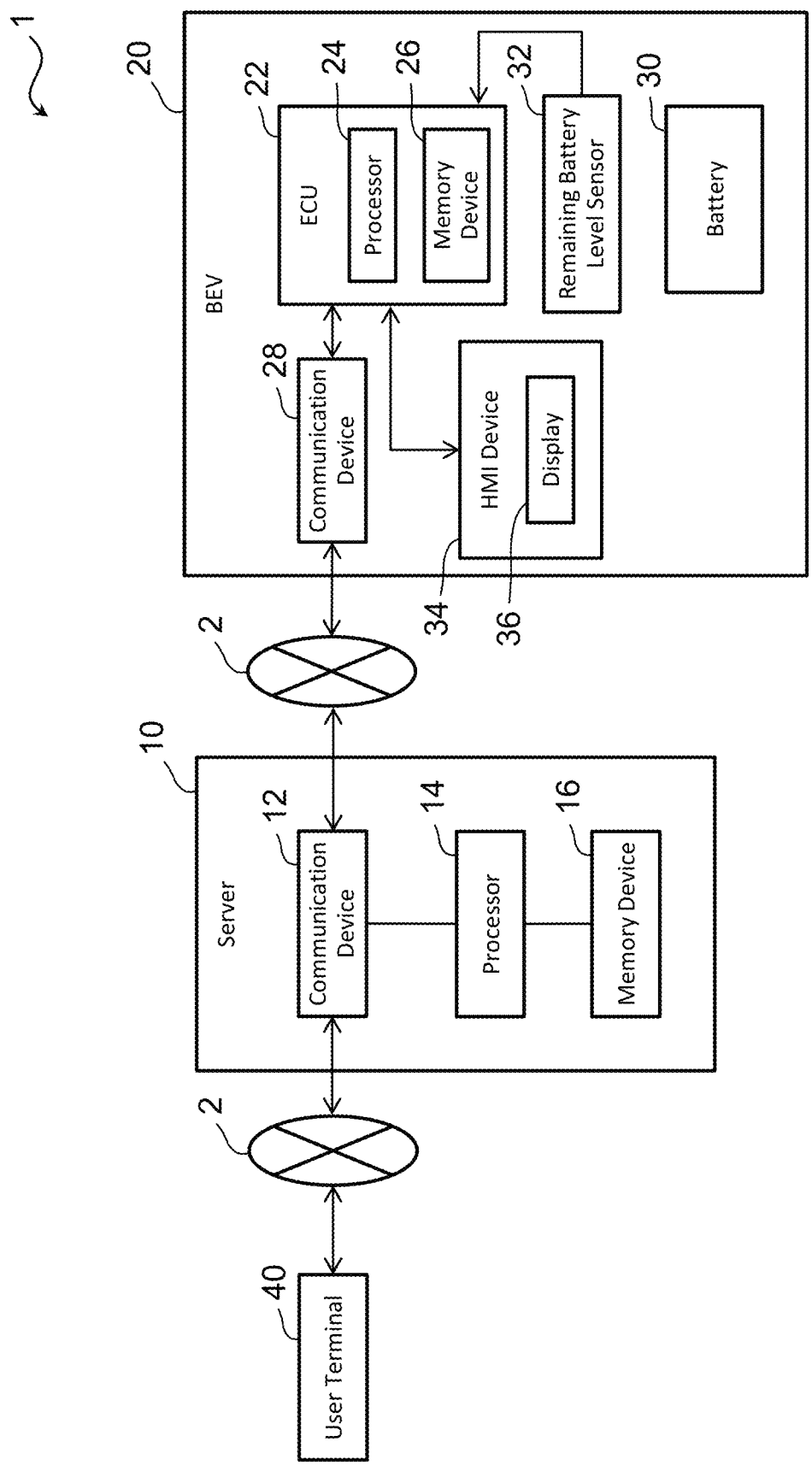
FIG. 1 is a diagram illustrating an example of a configuration of a display system to which a "remaining battery level display method" according to an embodiment is applied.

Hereinafter, embodiments of the present disclosure will be described with reference to the accompanying drawings. In the drawings, common elements are denoted by the same reference numerals, and redundant description thereof will be omitted or simplified.

1. System Configuration

FIG. 1 is a diagram illustrating an example of a configuration of a display system 1 to which a "remaining battery level display method" according to an embodiment is applied. The display system 1 includes a server 10, and a battery electric vehicle (BEV) 20 that can communicate with the server 10. Although only one BEV 20 is exemplarily illustrated in FIG. 1, a plurality of BEV 20 are basically connected to the server 10 so as to be able to communicate therewith. The BEV 20 is a rental vehicle to users. The BEV 20 may be an automated driving vehicle.

The server 10 is a computer configured to execute various processes related to the displaying of information on a remaining battery level q (i.e., "remaining level information Iq" described below). Specifically, the server 10 includes a communication device 12, a processor 14, and a memory device 16. The server 10 (communication device 12) is connected to the BEV 20 (communication device 28) via a communication network 2 such as a wireless network. The processor 14 executes the various processes described above. The memory device 16 stores various kinds of information. The processor 14 executes various computer programs, whereby the various processes by the server 10 are realized. The various computer programs are stored in the memory device 16 or recorded in a computer-readable recording medium. It should be noted that the processor 14 may be a combination of a plurality of processors, and the memory device 16 may be a combination of a plurality of memory devices.

As an example, the display system 1 also serves as a system for managing a rental service of the BEV 20. More specifically, the rental service is, for example, a car sharing service or a car rental service. The server 10 is also configured to execute various processes related to the rental service, such as reservation of the BEV 20. For this reason, the server 10 is connected to a user terminal 40 so as to be able to communicate therewith. The user terminal 40 is operated by a user who wishes to rent the BEV 20. The user terminal 40 is, for example, a smartphone or a personal computer, and includes a processor, a memory device, and a communication device. Although only one user terminal 40 is exemplarily illustrated in FIG. 1, user terminals 40 of a plurality of users are basically connected to the server 10 so as to be able to communicate therewith. It should be noted that the user can participate in the rental service by, for example, installing a dedicated application in the user terminal 40 and completing registration in the rental service.

The BEV 20 includes an electronic control unit (ECU) 22, a communication device 28, a battery 30, a remaining battery level sensor 32, and a human machine interface (HMI) device 34.

The ECU 22 is a computer installed in the BEV 20. Also, the ECU 22 is configured to execute various processes related to the displaying of the information on the remaining battery level q (i.e., the remaining level information Iq) together with the server 10. Specifically, the ECU 22 includes a processor 24 and a memory device 26. The processor 24 executes various processes. The memory device 26 stores various kinds of information. The processor 24 executes various computer programs, whereby the various processes by the ECU 22 are realized. The various computer programs are stored in the memory device 16 or recorded in a computer-readable recording medium. It should be noted that the ECU 22 may be a combination of a plurality of ECUs.

The communication device 28 includes a processor, and communicates with the server 10 via the communication network 2. The battery 30 is charged with electric power supplied from an external power supply. The electric power stored in the battery 30 is supplied to an electric motor for driving the BEV 20. The remaining battery level sensor 32 is configured to detect a remaining battery level q (kWh) of the battery 30. The remaining battery level sensor 32 detects the remaining battery level q based on, for example, at least one of the voltage of the battery 30 and the electric current flowing into and out of the battery 30. In the following description, the remaining battery level q detected by the remaining battery level sensor 32 is referred to as "actual remaining battery level qa".

The HMI device 34 includes a display 36. The display 36 is, for example, a display (for example, a meter panel or a touch panel) installed in an instrument panel of the BEV 20. Alternatively, the display 36 may be, for example, a head-up display (HUD) that displays information on a windshield of the BEV 20. The displaying of the display 36 includes displaying of information on the remaining battery level q of the battery 30. The display 36 can display the information on the remaining battery level q to a user of the BEV 20. Also, the HMI device 34 may include, for example, a speaker or a buzzer.

In the BEV 20 having the configuration described above, the configuration including the ECU 22 (processor 24) and the display 36 corresponds to an example of the "remaining battery level display device" according to the present disclosure.

2. Displaying of Remaining Battery Level

Charging an electric vehicle (BEV) takes time. As an example of a method of renting one BEV to a plurality of users, there is the following method. That is, a rental company puts the BEV into a fully charged state and rents the BEV to a plurality of users within a range of total battery capacity qt of the BEV. In this example, the BEV is rented to a plurality of users in each cycle (for example, each day) in which the rental company performs maintenance to bring the BEV into a fully charged state. As a result, the BEV may not be able to be rented to the second and subsequent users in the fully charged state.

Figure 2:
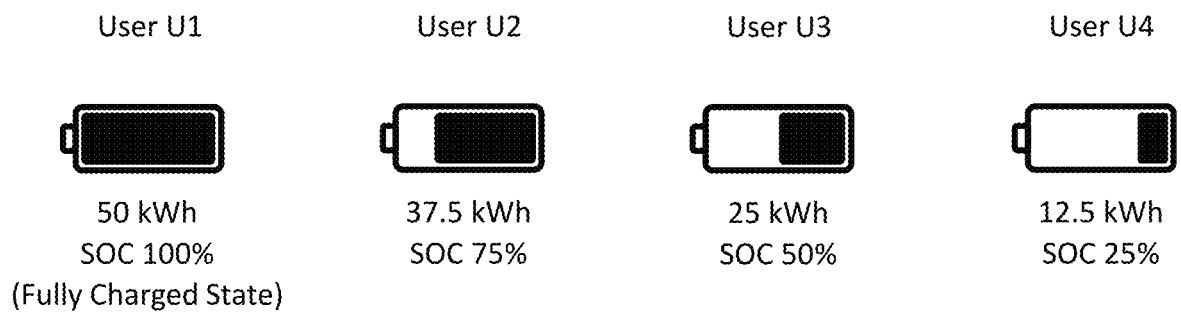
FIG. 2 is a diagram used to describe a problem caused by using an actual remaining battery level qa to provide information on a remaining battery level q to users.

Specifically, FIG. 2 is a diagram used to describe a problem caused by using the actual remaining battery level qa to provide information on the remaining battery level q to the users. The example of the rental method of the BEV used in the description here is described above, and one BEV is rented to a plurality of (for example, four) users U1 to U4. The battery of the BEV is fully charged when the BEV is rented to the first user U1.

The total battery capacity (i.e., a remaining capacity that can be charged and discharged) qt of the battery shown in FIG. 2 is equal to the actual remaining battery level qa in the fully charged state, and is, for example, 50 kWh. In addition, an actual remaining battery level qa0 at the start of rental to the user U1 is 100% in terms of SOC (State Of Charge). The SOC is one of the display methods of the remaining battery level, and corresponds to a charging rate of the battery, that is, a percentage display of the current remaining battery level with respect to the remaining battery level in a fully charged state.

In the example shown in FIG. 2, due to the use of the battery by the user U1, the actual remaining battery level qa at the start of rental to the second user U2 is reduced to 37.5 kWh (SOC 75%). Similarly, at the start of rental to the third user U3, the actual remaining battery level qa is reduced to 25 kWh (SOC 50%). At the start of rental to the fourth user U4, the actual remaining battery level qa is reduced to 12.5 kWh (SOC 25%).

As exemplarily illustrated in FIG. 2, when, for example, a BEV in a fully charged state is rented to a plurality of users in one day, the BEV may not be rented to the second and subsequent users in a fully charged state since charging of the BEV takes time. As a result, a BEV with a high remaining battery level is preferred by the users, and a BEV that is not in a fully charged state is kept away from the users. This leads to a reduction in the utilization rate per one BEV.

Figure 3:
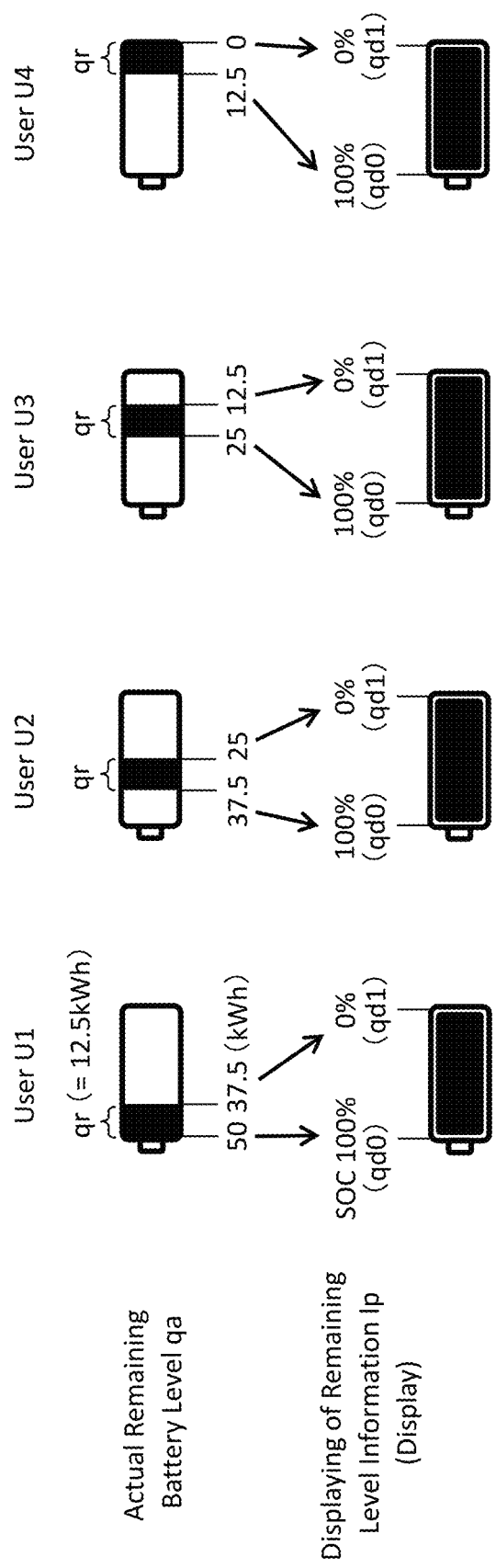
FIG. 3 is a diagram used to describe the display method of the remaining battery level q according to the embodiment.

FIG. 3 is a diagram used to describe the display method of the remaining battery level q according to the embodiment. Similarly to FIG. 2, FIG. 3 illustrates an example in which one BEV 20 is rented to four users U1 to U4 in one day.

In view of the problem described above, in the present embodiment, an "allocated battery capacity qr" is set in order to display the remaining battery level q on the display 36 of the BEV 20. The allocated battery capacity qr corresponds to a remaining battery level q allocated to each of the users U1 to U4. Each of the users U1 to U4 rents the BEV 20 on the assumption that the allocated battery capacity qr is the remaining battery capacity q that can be used during the rental of the BEV 20.

Specifically, as an example, the allocated battery capacity qr is a fixed value equally allocated to the four users U1 to U4. For example, when the total battery capacity qt is 50 kWh, the allocated battery capacity qr is 12.5 kWh. In addition, the number of people who rent the BEV at the time of setting the allocated battery capacity qr is determined in consideration of, for example, the average travel distance of one user and the electricity consumption rate of the BEV 20. The distance travelable with 12.5 kWh that is an example of the allocated battery capacity qr is, for example, 80 km. The method of setting the allocated battery capacity qr is not particularly limited. For example, the allocated battery capacity qr may be determined in accordance with a desired travel distance presented by each user at the time of reservation of the BEV 20. In other words, the allocated battery capacity qr may vary depending on the user. In addition, in order to specify the allocated battery capacity qr, for example, a predetermined travel distance (for example, 80 km) may be used as one unit, and at the time of the reservation, one or more units may be selected by the user as the desired travel distance.

More specifically, in the example shown in FIG. 3, in terms of the actual remaining battery level qa, the allocated battery capacity qr of the user U1 who rents in the fully charged state is specified in the range from 50 kWh to 37.5 kWh. Similarly, the allocated battery capacity qr of the user U2 is specified in the range from 37.5 kWh to 25 kWh. The allocated battery capacity qr of the user U3 is specified in the range from 25 kWh to 12.5 kWh. The allocated battery capacity qr of the user U4 is specified in the range from 12.5 kWh to 0 kWh.

Figure 4:
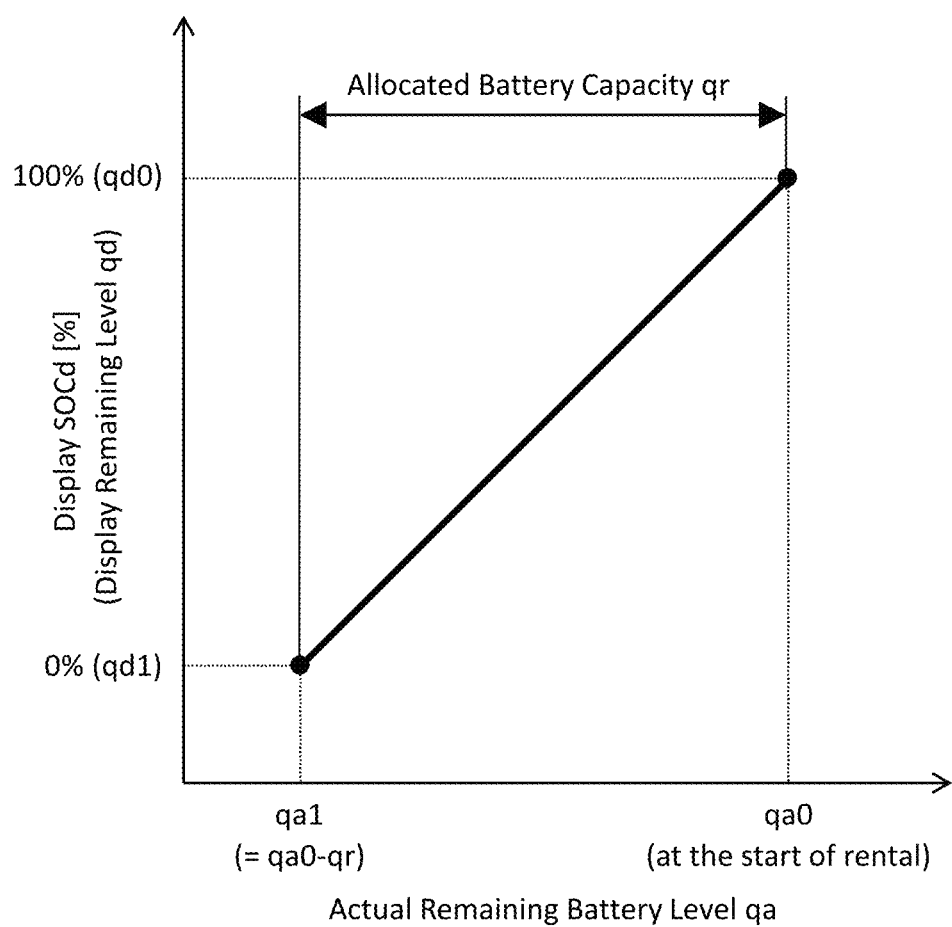
FIG. 4 is a diagram used to describe an example of a specific displaying of remaining level information Iq according to the embodiment.

Also, in the present embodiment, "remaining level information Iq" which is information on the remaining battery level q based on the allocated battery capacity qr is displayed on the display 36 of the BEV 20. In addition to FIG. 3, FIG. 4 is referred to here. FIG. 4 is a diagram used to describe an example of the specific displaying of the remaining level information Iq according to the embodiment. In the example shown in FIGS. 3 and 4, the remaining level information Iq correspond to the remaining battery level q displayed as a percentage in SOC. That is, in this example, the remaining level information Iq is displayed numerically on the display 36. In the following description, the remaining battery level q displayed on the display 36 is referred to as "display remaining level qd" in order to distinguish this from the actual remaining battery level qa. FIG. 4 shows a relation between a display SOCd (i.e., display remaining level qd), which is the SOC displayed on the display 36, and the actual remaining battery level qa (i.e., actual SOC).

To be more specific, the displaying of the remaining level information Iq includes displaying, as 100% in SOC, a remaining battery level (i.e., display remaining level qd0) at the start of rental to a user. Also, the displaying of the remaining level information Iq includes displaying, as 0%, an actual remaining battery level qa1 (i.e., display remaining level qd1) lower than an actual remaining battery level qa0 at the start of the rental by the allocated battery capacity qr. Also, as shown in FIG. 4, the displaying of the remaining level information Iq includes displaying the display SOCd (i.e., display remaining level qd) so as to decrease between 100% (display remaining level qd0) and 0% (display remaining level qd1) in accordance with a decrease in the actual remaining battery level qa. The display SOCd is displayed so as to change in units of 1%, for example.

As described above, in the present embodiment, the displaying of the remaining level information Iq to the user is not performed using the actual remaining battery level qa itself. To be more specific, as exemplarily illustrated in FIG. 3, at the start of the rental to each of the users U1 to U4, the display SOCd is displayed as 100% instead of a value corresponding to the actual remaining battery level qa0 at the start. Also, when each of the users U1 to U4 consumes the actual remaining battery level qa by the allocated remaining battery capacity qr after the start of the rental, the display SOCd is displayed as 0% instead of a value corresponding to the actual remaining battery level qa1 at the start.

Figure 5:
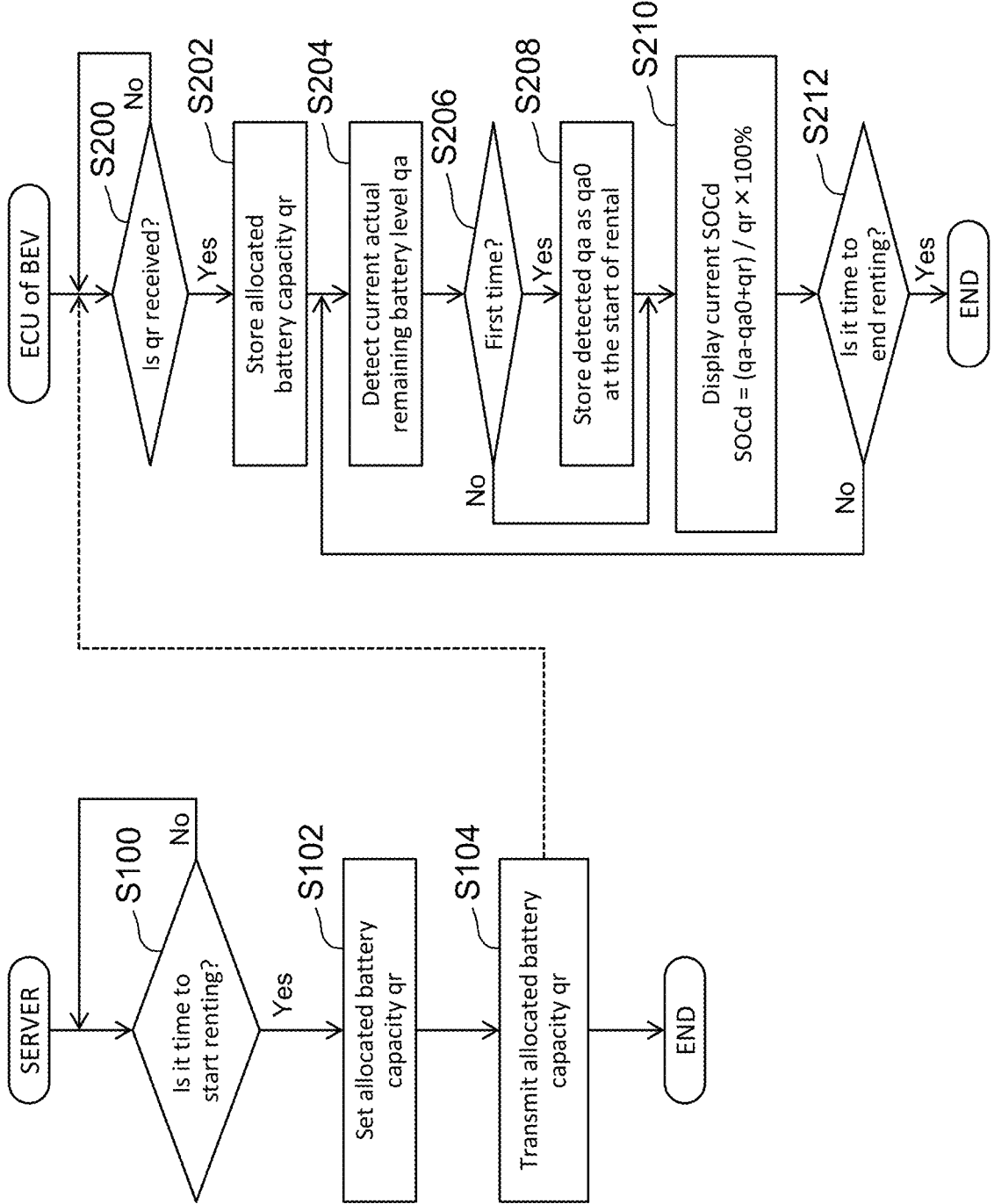
FIG. 5 is a flowchart showing a flow of processing related to displaying of the remaining level information Iq according to the embodiment.

FIG. 5 is a flowchart showing a flow of processing related to the displaying of the remaining level information Iq according to the embodiment. The processing of this flowchart (in other words, the processing for realizing the "remaining battery level display method" according to the present disclosure) is executed by cooperation between the server 10 and the ECU 22 of the BEV 20, for example. It should be noted that the processing of the flowchart is executed for each user who rents the BEV 20.

In step S100, the server 10 (processor 14) determines whether or not it is time to start renting the BEV 20 to a user. For example, the server 10 determines whether or not the rental start time has arrived on the basis of a result of communication between the server 10 and the user terminal 40 of the user performed when the rental of the BEV 20 is started.

When the rental start time has arrived in step S100, the processing proceeds to step S102. In step S102, the server 10 sets the allocated battery capacity qr by the method described above.

Then, in step S104, the server 10 transmits, to the BEV 20, the allocated battery capacity qr that is set in step S102.

On the other hand, in step S200, the ECU 22 (processor 24) of the BEV 20 determines whether or not the allocated battery capacity qr has been received from the server 10. As a result, when the allocated battery capacity qr is received, in step S202 the ECU 22 stores the received allocated battery capacity qr in the memory device 26.

Then, in step S204, the ECU 22 detects the current actual remaining battery level qa of the battery 30 using the remaining battery level sensor 32.

Then, in step S206, the ECU 22 determines whether or not the detection of the current actual remaining battery level qa in step S204 is the first detection. As a result, when the determination result is Yes, in step S208 the ECU 22 stores the actual remaining battery level qa detected this time in the memory device 26 as the actual remaining battery level qa0 at the start of the rental.

After step S208, or when the determination result in step S206 is No, the processing proceeds to step S210. In step S210, the ECU 22 calculates a display SOCd (corresponding to the current display remaining level qd) which is the current SOC displayed on the display 36, and displays the display SOCd on the display 36. The display SOCd is calculated by the following Equation (1).

$$SOCd = \frac{qa - qa0 + qr}{qr} \times 100\% \quad (1)$$

Then, in step S212, the ECU 22 determines whether or not it is time to end renting the BEV 20 to the user. For example, the server 10 determines whether or not the rental end time has arrived on the basis of a result of communication between the server 10 and the user terminal 40 of the user performed when the rental of the BEV 20 is ended. When the determination result is No, the ECU 22 repeatedly executes the processing at and after step S204. As a result, the display SOCd is updated in accordance with a decrease in the actual remaining battery level qa. On the other hand, when the determination result is Yes, the processing proceeds to END.

Additionally, unlike the above-described processing shown in FIG. 5, for example, the server 10 may receive the actual remaining battery level qa (including the actual remaining battery level qa0 at the start of the rental) from the BEV 20, calculate the display SOCd based on the received actual remaining battery level qa, and transmit the calculated display SOCd to the BEV 20.

3. Effect

As described above, according to the present embodiment, the remaining level information Iq is displayed to the user not by using the actual remaining battery level qa itself but by using the display SOCd based on the allocated battery capacity qr. The display SOCd is displayed as 100% at the start of rental to each user, and is displayed as 0% when each user consumes the actual remaining battery level qa by the allocated battery capacity qr after the start of the rental. That is, even when the actual remaining battery level qa at the start of the rental to each user is not in the fully charged state, it is possible to display the fully charged state (i.e., SOC 100%) for each user and rent the BEV 20. This can reduce a decrease in the utilization rate of the rental BEV 20 due to the inability to rent in the fully charged state. That is, the utilization rate of the rental BEV 20 can be improved.

4. Other Display Examples of Remaining Level Information Iq

The remaining level information Iq may be displayed on the display 36 as described below instead of the examples shown in FIGS. 3 and 4.

4-1. Graphic Displaying of Remaining Level Information Iq

Figure 6:
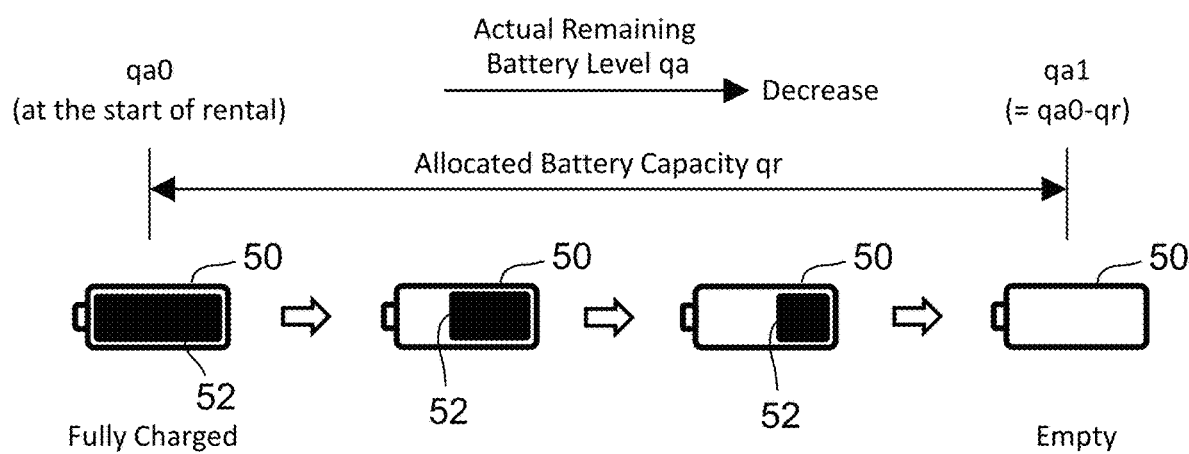
FIG. 6 is a diagram used to describe a first modified example of the specific displaying of the remaining level information Iq according to the embodiment.

FIG. 6 is a diagram used to describe a first modified example of the specific displaying of the remaining level information Iq according to the embodiment. The displaying of the remaining level information Iq may be performed by using figures as shown in FIG. 6, for example, instead of the example of using the numerical values of the SOC as shown in FIG. 4.

In the example shown in FIG. 6, a battery mark 50 representing the battery 30 is displayed on the display 36. The battery mark 50 is used for displaying the remaining level information Iq. To be more specific, at the start of the rental, the battery mark 50 is displayed so as to indicate the fully charged state (SOC 100%). That is, at the start of the rental, the inside of the battery mark 50 is filled with a bar 52 indicating the display remaining level qd. Further, the battery mark 50 is displayed so as to indicate the empty state (SOC 0%) when the actual remaining battery level qa is reduced by the allocated battery capacity qr from the start of the rental. That is, at this time, the bar 52 is not displayed. Also, as shown in FIG. 6, the battery mark 50 is displayed such that, for example, the length of the bar 52 changes between the fully charged state and the empty state in accordance with a decrease in the actual remaining battery level qa.

4-2. Displaying of a Negative Range and a Range Higher than 100%

Figure 7A:
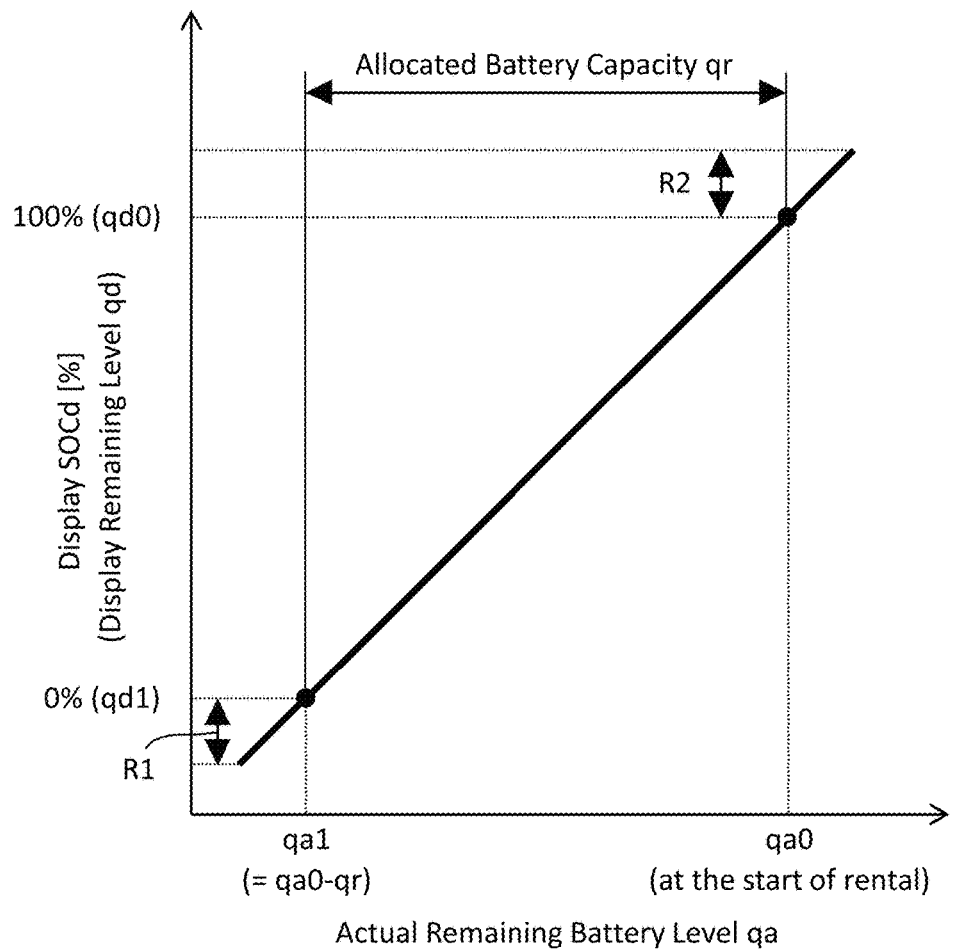
FIG. 7A is a diagram used to describe a second modified example of the specific displaying of the remaining level information Iq according to the embodiment.
Figure 7B:
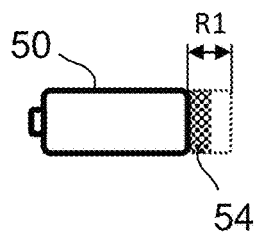
FIG. 7B is a diagram used to describe the second modified example.
Figure 7C:
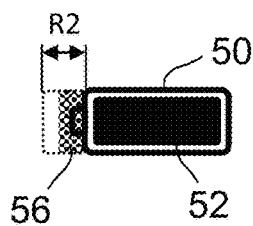
FIG. 7C is a diagram used to describe the second modified example.

FIGS. 7A to 7C are diagrams used to describe a second modified example of the specific displaying of the remaining level information Iq according to the embodiment.

First, FIG. 7A shows an example in which the remaining level information Iq is the display remaining level qd which is displayed as a percentage in SOC (i.e., an example of numerical displaying), similarly to FIG. 4. As in the example shown in FIG. 7A, the displaying of the remaining level information Iq may include displaying a negative range R1 in which the SOC is lower than 0%. More specifically, according to Equation (1) described above, when the user consumes the remaining battery level q higher than the allocated battery capacity qr, the display SOCd takes a negative value. When the display SOCd takes a negative value in this way, the ECU 22 may the display SOCd on the display 36 using not only the range of 100% to 0% but also the negative range R1. This makes it easy for a user to recognize that the remaining battery level q used by the user exceeds the allocated battery capacity qr. It should be noted that the lower limit of the negative range R1 is, for example, an actual remaining battery level qa corresponding to the actual SOC 0%.

Further, as in the example shown in FIG. 7A, the displaying of the remaining level information Iq may include displaying a range R2 in which the SOC is higher than 100%. More specifically, according to Equation (1) described above, when the user charges the battery 30 during the rental of the BEV 20, the display SOCd takes a value higher than 100%. When the display SOCd takes a value higher than 100% as described above, the ECU 22 may display the display SOCd on the display 36 using not only the range of 100% to 0% but also the range R2 higher than 100%. This makes it possible to display in an easy-to-understand manner that the user has returned the BEV 20 while leaving the actual remaining battery level qa which is greater than that at the start of the rental. In addition, when the user returns the BEV 20 while the actual remaining battery level qa is excessively left so as to be greater than that at the start of the rental as described above, for example, the rental fee of the BEV 20 paid by the user may be discounted by an excessively left actual remaining battery level qa. As a result, the user can easily recognize the discount amount of the rental fee by using the fact that the display SOCd is displayed in the range R2. It should be noted that the upper limit of the range R2 is, for example, an actual remaining battery level qa corresponding to the actual SOC 100%.

Even where the remaining level information Iq is graphically displayed using the battery mark 50 as in the example shown in FIG. 6, the displaying of the negative range R1 may be included. Specifically, as shown in FIG. 7B, the negative range R1 may be displayed, for example, by using a bar 54, which is different from the bar 52 indicating that the remaining battery level q is between the fully charged state and the empty state.

Furthermore, even where the remaining level information Iq is graphically displayed using the battery mark 50, the displaying of the range R2 higher than 100% may be included. Specifically, as shown in FIG. 7C, the range R2 may be displayed, for example, by using a bar 56, which is different from the bar 52 indicating that the remaining battery level q is between the fully charged state and the empty state.

In addition, the remaining level information Iq displayed numerically or graphically may include only one of the displaying of the negative range R1 and the displaying of the range R2 higher than 100%.

4-3. Displaying of Battery Capacity

Figure 8:
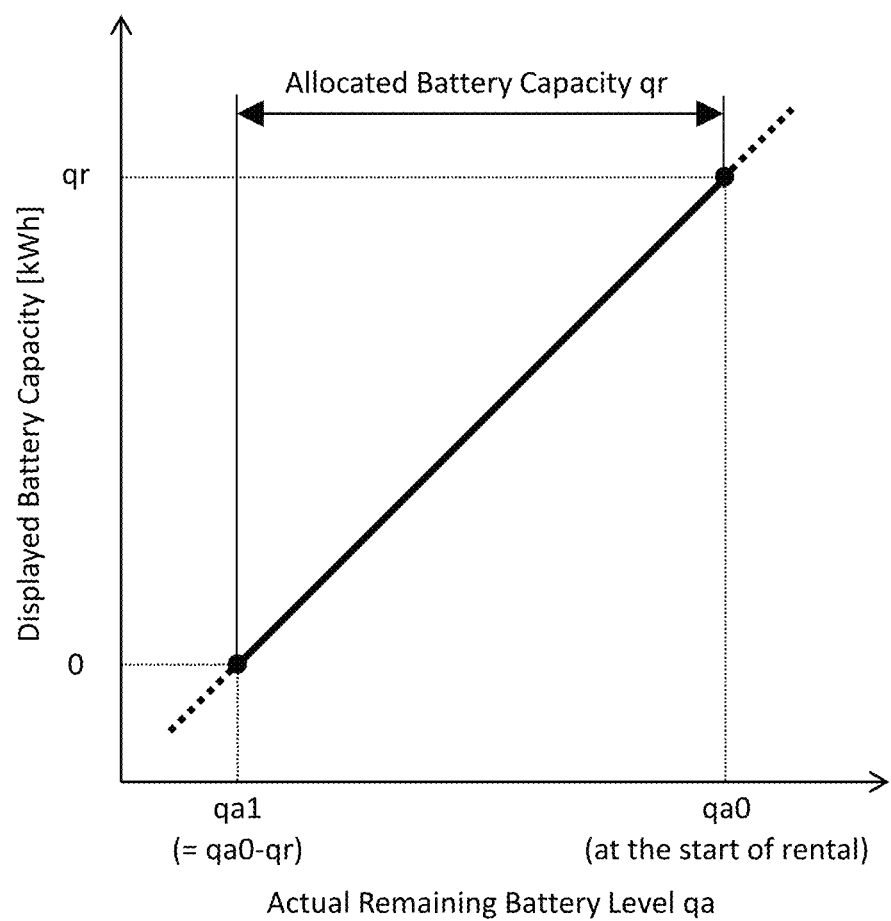
FIG. 8 is a diagram used to describe a third modified example of the specific displaying of the remaining level information Iq according to the embodiment.

FIG. 8 is a diagram used to describe a third modified example of the specific displaying of the remaining level information Iq according to the embodiment. The numerical displaying of the remaining level information Iq may be performed by, for example, using the displaying of the battery capacity (for example, in kWh) as shown in FIG. 8, instead of the example of using the percentage displaying of the SOC as shown in FIG. 4. FIG. 8 shows a relation between the battery capacity and the actual remaining battery level qa.

To be specific, the displaying of the remaining level information Iq may include displaying the allocated battery capacity qr (for example, 12.5 kWh) as the remaining battery level at the start of the rental to a user. Also, the displaying of the remaining level information Iq may include displaying, as 0 (for example, 0 kWh), the remaining battery level (i.e., actual remaining battery level qa1) lower than the actual remaining battery level qa0 at the start of the rental by the allocated battery capacity qr. Further, as shown in FIG. 8, the displaying of the remaining level information Iq may include displaying the battery capacity so as to decrease between the allocated battery capacity qr and 0 in accordance with a decrease in the actual remaining battery level qa. For example, the battery capacity is displayed so as to change in units of 1 kWh.

According to the third modified example described above, the displaying of the remaining level information Iq to the user is performed not by using the actual remaining battery level qa itself but by using the battery capacity. The battery capacity is displayed as the allocated battery capacity qr at the start of the rental to each user, and is displayed as 0 when each user consumes the actual remaining battery level qa by the allocated battery capacity qr after the start of the rental. That is, even when the actual remaining battery level qa0 at the start of the rental to each user does not indicate the fully charged state, the BEV 20 can be rented to each user while the allocated battery capacity qr (i.e., the upper limit value) is displayed for each user. In addition, the allocated battery capacity qr corresponds to the upper limit of the remaining battery level q of the BEV 20 that can be used by each user. Therefore, the displaying of the allocated battery capacity qr has a meaning similar to the displaying of the fully charged state for the user. Therefore, according to the third modified example as well, it is possible to reduce a decrease in the utilization rate of the rental BEV 20 caused by the fact that the BEV 20 cannot be rented in the fully charged state. That is, the utilization rate of the rental BEV 20 can be improved.

Additionally, similarly to the example illustrated in FIG. 7, the displaying of the remaining level information Iq using the battery capacity display as in the third modified example may also include at least one of the displaying of a negative range in which the battery capacity is less than 0 (broken line in FIG. 8) and the displaying of a range in which the battery capacity is greater than the allocated battery capacity qr (broken line in FIG. 8).

4-4. Displaying of Travelable Distance

Figure 9:
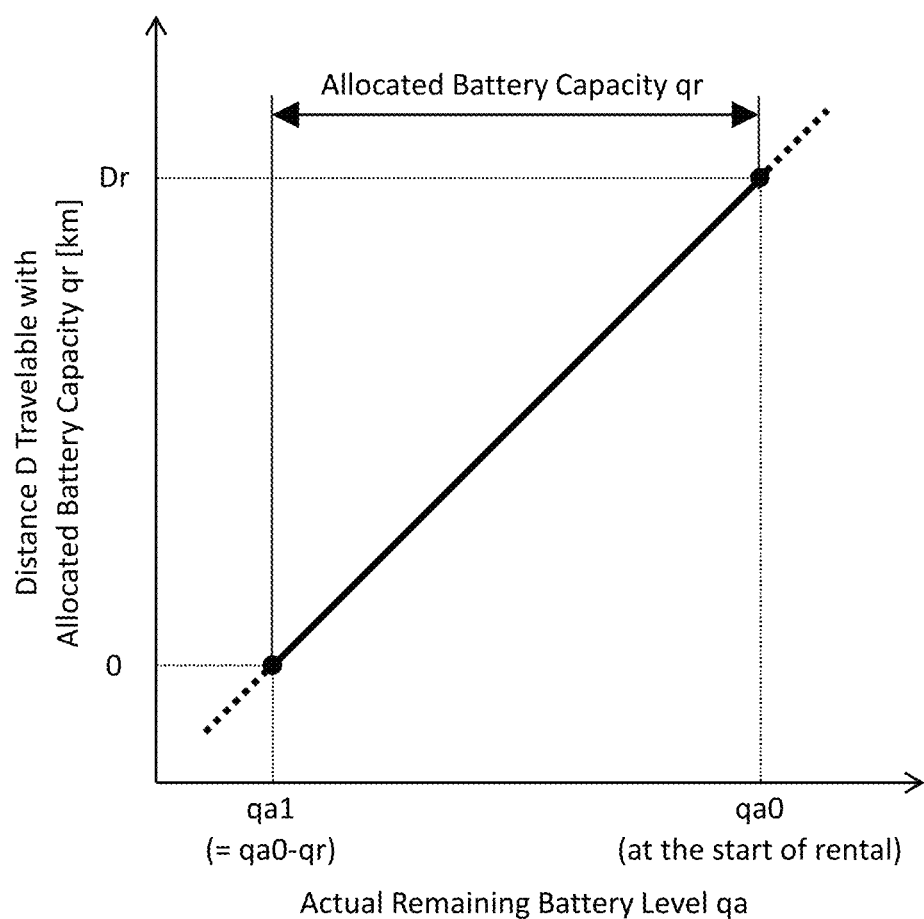
FIG. 9 is a diagram used to describe a fourth modified example of the specific displaying of the remaining level information Iq according to the embodiment.

FIG. 9 is a diagram used to describe a fourth modified example of the specific displaying of the remaining level information Iq according to the embodiment. The numerical displaying of the remaining level information Iq may be performed by, for example, using the displaying of travelable distance (for example, km or mile) of the BEV 20 as shown in FIG. 9, instead of the example of using the percentage displaying of the SOC as shown in FIG. 4. FIG. 9 shows a relation between travelable distance D and the actual remaining battery level qa.

To be specific, the displaying of the remaining level information Iq may include displaying a distance Dr (for example, 80 km) travelable with the allocated battery capacity qr as the remaining battery level at the start of the rental to a user. Also, the displaying of the remaining level information Iq may include displaying, as 0 (for example, 0 km), the remaining battery level (i.e., actual remaining battery level qa1) lower than the actual remaining battery level qa0 at the start of the rental by the allocated battery capacity qr. Further, as shown in FIG. 9, the displaying of the remaining level information Iq may include displaying the travelable distance D so as to decrease between the distance Dr and 0 in accordance with a decrease in the actual remaining battery level qa. For example, the travelable distance D is displayed so as to change in units of 1 km.

According to the fourth modified example described above, the displaying of the remaining level information Iq to the user is performed not by using the actual remaining battery level qa itself but by using the travelable distance D. The travelable distance D is displayed as the distance Dr at the start of the rental to each user, and is displayed as 0 when each user consumes the actual remaining battery level qa by the allocated battery capacity qr after the start of the rental. That is, even when the actual remaining battery level qa0 at the start of the rental to each user does not indicate the fully charged state, the BEV 20 can be rented to each user while the distance Dr (i.e., the upper limit value of the travelable distance D) is displayed for each user. In addition, the distance Dr corresponds to the upper limit of the remaining battery level q of the BEV 20 that can be used by each user. Therefore, the displaying of the distance Dr is a value having a meaning similar to the displaying of the fully charged state for the user. Therefore, according to the fourth modified example as well, it is possible to reduce a decrease in the utilization rate of the rental BEV 20 caused by the fact that the BEV 20 cannot be rented in the fully charged state. That is, the utilization rate of the rental BEV 20 can be improved.

Additionally, similarly to the example illustrated in FIG. 7, the displaying of the remaining level information Iq using the travelable distance display as in the fourth modified example may also include at least one of the displaying of a negative range in which the travelable distance D is shorter than 0 (broken line in FIG. 9) and the displaying of a range in which the travelable distance D is longer than the distance Dr (broken line in FIG. 9).

4-5. Other Examples of Graphical Displaying of Remaining Level Information Iq

FIG. 10 is a diagram used to describe a fifth modified example of the specific displaying of the remaining level information Iq according to the embodiment. Similarly to the first modified example shown in FIG. 6, also in the fifth modified example, the remaining level information Iq is graphically displayed using a battery mark 60 representing the battery 30. It should be noted that, as in FIG. 3, FIG. 10 is associated with an example in which one BEV 20 is rented to four users U1 to U4 in one day.

Specifically, the size of the battery mark 60 corresponds to the total battery capacity qt of the battery 30. In the displaying of the remaining level information Iq according to the fifth modified example, as shown in FIG. 10, on the battery mark 60, the actual remaining battery level qa0 at the start of the rental to each user U1 to U4 is associated with an upper limit qru of the allocated battery capacity qr. Also, the displaying of the remaining level information Iq includes graphically displaying the remaining battery level q on the battery mark 60 by a bar 62 whose length changes so as to decrease within the range of the allocated battery capacity qr in accordance with a decrease in the actual remaining battery level qa. More specifically, as shown in FIG. 10, when the users U1 to U4 change, the actual remaining battery level qa0 at the start of the rental will be different. For this reason, the position of the allocated battery capacity qr on the battery mark 60 differs depending on the users U1 to U4.

According to the fifth modified example described above, unlike the various examples described above, the manner in which the remaining level information Iq based on the allocated battery capacity qr is displayed (more specifically, the position of the bar 62 on the battery mark 60) differs depending on the actual remaining battery level qa0 at the start of the rental to each user. However, the displaying of the remaining level information Iq according to the fifth modified example is also not performed mainly using the actual remaining battery level qa itself. Further, according to the fifth modified example as well, even when the actual remaining battery level qa0 at the start of the rental to each user does not indicate the fully charged state, the BEV 20 can be rented to each user while clearly displaying for each user that the remaining battery level q corresponding to the allocated battery capacity qr is secured. Therefore, according to the fifth modified example as well, it is possible to reduce a decrease in the utilization rate of the rental BEV 20 caused by the fact that the BEV 20 cannot be rented in the fully charged state. That is, the utilization rate of the rental BEV 20 can be improved.

Moreover, the displaying of the remaining level information Iq according to the fifth modified example may include displaying a range R3 that is less than a lower limit qrl of the allocated battery capacity qr by a graphic (for example, a bar 64) in the same manner as the examples illustrated in FIGS. 7B and 7C using a graphic. Furthermore, the displaying of the remaining level information Iq according to the fifth modified example may include displaying a range R4 that is greater than an upper limit qru of the allocated battery capacity qr by a graphic (for example, a bar 66) instead of or in addition to the range R3. It should be noted that, in FIG. 10, these ranges R3 and R4 are exemplarily illustrated only for the displaying for the user U1.

Additionally, various types of displaying of the remaining level information Iq illustrated in FIGS. 4, 6, and 8 to 10 may be performed in combination as appropriate.

5. Additional Problem and Measures

A user Ux who rents the BEV 20 in which the displaying of the remaining level information Iq is performed as described above may travel using a remaining battery level q higher than the allocated remaining battery capacity qr (that is, the remaining battery level q reserved for the user Ux). As a result, the next user who rents the same BEV 20 after the user Ux may not be able to use the remaining battery level q corresponding to his/her allocated battery capacity qr. With respect to the additional problem, the following first to third measures may be executed.

First, the first measure may be executed as follows. That is, when the user Ux has consumed the remaining battery level q corresponding to the allocated battery capacity qr (for example, when the display SOCd becomes 0%), the ECU 22 of the BEV 20 performs notification to warn the user Ux that the available remaining battery level q has been consumed. The notification is performed using the HMI device 34, for example. More specifically, the notification is performed using, for example, at least one of displaying by the display 36 and voice or sound by a speaker or a buzzer.

Then, when the user Ux ignores the warning described above (more specifically, for example, when the user Ux does not stop driving the BEV 20 within a designated time after the warning is started), the ECU 22 controls the traveling of the BEV 20 such that the traveling is stopped. To be specific, the ECU 22 controls the BEV 20 such that electric power is not supplied from the battery 30 to the electric motor for traveling.

Moreover, the second measure may be executed as follows. That is, a user who rents the BEV 20 before the user Ux may use only a remaining battery level q lower than the remaining battery level q corresponding to the allocated remaining battery capacity qr. Therefore, as the second measure, the ECU 22 first controls the HMI device 34 so as to perform notification for a first warning at a time point when the user Ux has consumed the remaining battery level q corresponding to the allocated battery capacity qr. The first warning is for notifying the user Ux that the remaining battery level q corresponding to the allocated battery capacity qr has been consumed.

Then, in the second measure, the user Ux who has consumed the remaining battery level q corresponding to the allocated battery capacity qr is permitted to use a remaining battery level q higher than the allocated battery capacity qr on the condition that the user Ux leaves a remaining battery level q corresponding to the integrated value of the allocated battery capacity qr of one or more users who are scheduled to rent the BEV 20 after the user Ux.

In the second measure, the ECU 22 executes the following processing in relation to the permission described above. That is, the ECU 22 determines whether or not the actual remaining battery level qa has reached an actual remaining battery level qax corresponding to the integrated value. The information on the actual remaining battery level qax is grasped by the server 10 that manages reservation of the BEV 20 by each user. Therefore, the information on the actual remaining battery level qax is transmitted from the server 10 to the ECU 22. Then, when the determination result is Yes, the ECU 22 controls the HMI device 34 to perform notification for a second warning. The second warning is for notifying the user Ux that the remaining battery level q corresponding to the permission described above has been consumed in addition to the remaining battery level q corresponding to the allocated battery capacity qr. When the user Ux ignores the second warning, the ECU 22 may stop the traveling of the BEV 20 in the same manner as the first measure described above. It should be noted that the permission may be made on the condition that the user Ux pays an extra fee.

Furthermore, the third measure may be executed as follows. That is, when the user Ux has consumed the remaining battery level q corresponding to the allocated battery capacity qr, the ECU 22 performs notification for a warning to the user Ux. This warning is for asking the user Ux himself/herself to charge the battery 30 up to the lower limit qrl (for example, 0% in the display SOCd) of the allocated battery capacity qr and then return the BEV 20. In addition, the warning may include information that a fine is imposed when the actual remaining battery level qa does not reach the lower limit qrl at the time of returning the BEV 20.

Additionally, in the various examples of the displaying of the remaining level information Iq described above, the information on the actual remaining battery level qa such as the actual SOC is not displayed to the users who each rent the BEV 20. However, in order to display the actual remaining battery level qa to a staff of the company managing the rental BEV 20, the HMI device 34 may be configured, for example, to display the actual remaining battery level qa when the staff performs a designated operation.

What is claimed is:

1. A remaining battery level display method of displaying a remaining battery level of a rental electric vehicle, comprising:
    setting an allocated battery capacity allocated to a user of a plurality of users of the rental electric vehicle; and
    displaying, on a display of the rental electric vehicle, remaining level information based on the allocated battery capacity, wherein the displaying of the remaining level information includes:
    displaying, as 100%, a remaining battery level at a start of rental to the user of the plurality of users, displaying, as 0%, a remaining battery level lower than an actual remaining battery level at the start of the rental by the allocated battery capacity, and
    displaying the remaining battery level so as to decrease between 100% and 0% in accordance with a decrease in the actual remaining battery level for the allocated battery capacity for the user of the plurality of users.

2. The remaining battery level display method according to claim 1, wherein
    the displaying of the remaining level information includes displaying a negative range lower than 0%.

3. The remaining battery level display method according to claim 1, wherein
    the displaying of the remaining level information includes displaying a range higher than 100%.

4. A remaining battery level display method of displaying a remaining battery level of a rental electric vehicle, comprising:
    setting an allocated battery capacity allocated to a user of a plurality of users of the rental electric vehicle; and
    displaying, on a display of the rental electric vehicle, remaining level information based on the allocated battery capacity, wherein the displaying of the remaining level information includes:
    displaying, as a remaining battery level at a start of rental to the user of the plurality of users, the allocated battery capacity or a distance travelable with the allocated battery capacity, displaying, as 0, a remaining battery level lower than an actual remaining battery level at the start of the rental by the allocated battery capacity, and
    displaying the remaining battery level so as to decrease between the allocated battery capacity, or the distance, and 0, in accordance with a decrease in the actual remaining battery level for the allocated battery capacity for the user of the plurality of users.

5. The remaining battery level display method according to claim 4, wherein
    the displaying of the remaining level information includes displaying a negative range less than 0.

6. The remaining battery level display method according to claim 4, wherein
    the displaying of the remaining level information includes displaying a range greater than the allocated battery capacity or the distance.

7. A remaining battery level display method of displaying a remaining battery level of a rental electric vehicle, comprising:
    setting a particular allocated battery capacity allocated to each user of a plurality of users of the rental electric vehicle; and using a battery mark representing a battery to display, on a display of the rental electric vehicle, remaining level information based on the particular allocated battery capacity, wherein the displaying of the remaining level information includes graphically displaying the remaining battery level on the battery mark indicating a total battery capacity such that the remaining battery level decreases within a range of the particular allocated battery capacity in accordance with a decrease in actual remaining battery level while an actual remaining battery level at a start of rental is associated with an upper limit of the particular allocated battery capacity for the each user of the plurality of users.

8. The remaining battery level display method according to claim 7, wherein
the displaying of the remaining level information includes graphically displaying a range less than a lower limit of the allocated battery capacity.

9. The remaining battery level display method according to claim 7, wherein
the displaying of the remaining level information includes graphically displaying a range greater than the upper limit.

* * * * *